United States Patent [19]
Cole et al.

[11] Patent Number: 5,285,023
[45] Date of Patent: Feb. 8, 1994

[54] DOWNHOLE HYDRAULIC ROTARY SEISMIC SOURCE

[75] Inventors: Jack H. Cole, Ponca City; Marvin E. Janda, Kildare, both of Okla.

[73] Assignee: Conoco Inc., Ponca City, Okla.

[21] Appl. No.: 954,831

[22] Filed: Sep. 29, 1992

[51] Int. Cl.$^5$ .............................................. G01V 1/40
[52] U.S. Cl. .................................... 181/106; 367/912
[58] Field of Search ................ 181/102, 104, 106, 113; 367/912, 75

[56] References Cited

U.S. PATENT DOCUMENTS

| | | | |
|---|---|---|---|
| 4,709,362 | 11/1987 | Cole | 367/189 |
| 4,874,081 | 10/1989 | Cole | 181/106 |
| 5,159,160 | 10/1992 | Brett | 181/106 |

Primary Examiner—Ian J. Lobo
Attorney, Agent, or Firm—M. Kathryn Braquet Tsirigotis

[57] ABSTRACT

The present invention relates to an improved downhole seismic source for the simultaneous generation of elliptically polarized shear wave seismic energy and compression wave seismic energy coupled into a borehole. The source of the present invention is capable of receiving several kilowatts of energy downhole to depths of several thousand feet. An orbital vibrator, energized by a hydraulic power means is disposed within a housing. The orbital vibrator imparts an orbital motion which generates seismic wave energy in the borehole. A cable supports the hydraulic power means and the orbital vibrator at selected positions along the borehole for coupling of the seismic wave energy into the borehole.

1 Claim, 4 Drawing Sheets

DOWNHOLE HYDRAULIC ROTARY SEISMIC SOURCE

BACKGROUND OF THE INVENTION

1. Field of the Invention

The invention relates generally to downhole seismic sources and, more particularly, but not by way of limitation, it relates to an improved type of orbital vibration source with a hydraulic power means for generating both shear wave and compression wave energy into an earth medium.

2. Description of the Prior Art

Many different types of downhole seismic source mechanisms have been utilized for inducing acoustic energy into a borehole wall and subsequently analyzing velocity and/or phase of received energy to ascertain certain lithologic information. There are currently on-going efforts in the industry to develop suitable downhole sources for generation of shear waves and/or compression waves with greater power and high signal-to-noise ratios to enable new approaches to seismic data acquisition. Current efforts have taken various forms and utilize diverse mechanisms in attempts to impart a clean, concise seismic energy input through the borehole wall or, in some cases, the well casing, and it is contemplated that development of such sources will open new possibilities of seismic data acquisition and interpretation.

U.S. Pat. No. 4,874,061 issued Oct. 17, 1989 to Cole, entitled "Downhole Orbital Seismic Source" relates to a downhole seismic source for the generation of elliptically polarized seismic shear waves and compression waves in a borehole. The invention uses the sonde casing of a generally cylindrical shape which houses an interactive rotational disk or the like to impart transverse rotational motion through the coupling wellbore fluid into the borehole wall. The invention contemplates a number of different types of basic orbital motion generators including motor driven eccentric disks.

SUMMARY OF THE INVENTION

The present invention relates to an improved downhole seismic source for the simultaneous generation of elliptically polarized shear wave seismic energy and compression wave seismic energy coupled into a borehole. The source of the present invention is capable of receiving several kilowatts of energy downhole to depths of several thousand feet. An orbital vibrator, energized by a hydraulic power means is disposed within a housing. The orbital vibrator imparts an orbital motion which generates seismic wave energy in the borehole. A cable supports the hydraulic power means and the orbital vibrator at selected positions along the borehole for coupling of the seismic wave energy into the borehole.

The orbital source features a bearing mounted rotor which is optimized for weight eccentricity to total rotor weight and with minimized rotational wind drag. The source provides distributed force contact between the internal components and the external housing and allows two hydraulic motors with single shafts to synchronously drive two separate rotor assemblies, which are located axially such that a tendency to excite a fundamental bending mode is minimized. The invention includes a built-in lubricant recirculating system intended to lengthen the life of the rotor bearings. The invention also features a light-weight stiff synchronizing shaft which does not require a carrier bearing to be located at its center to preclude lateral vibrations of the shaft.

DETAILED DESCRIPTION OF THE INVENTION

Figure 1:
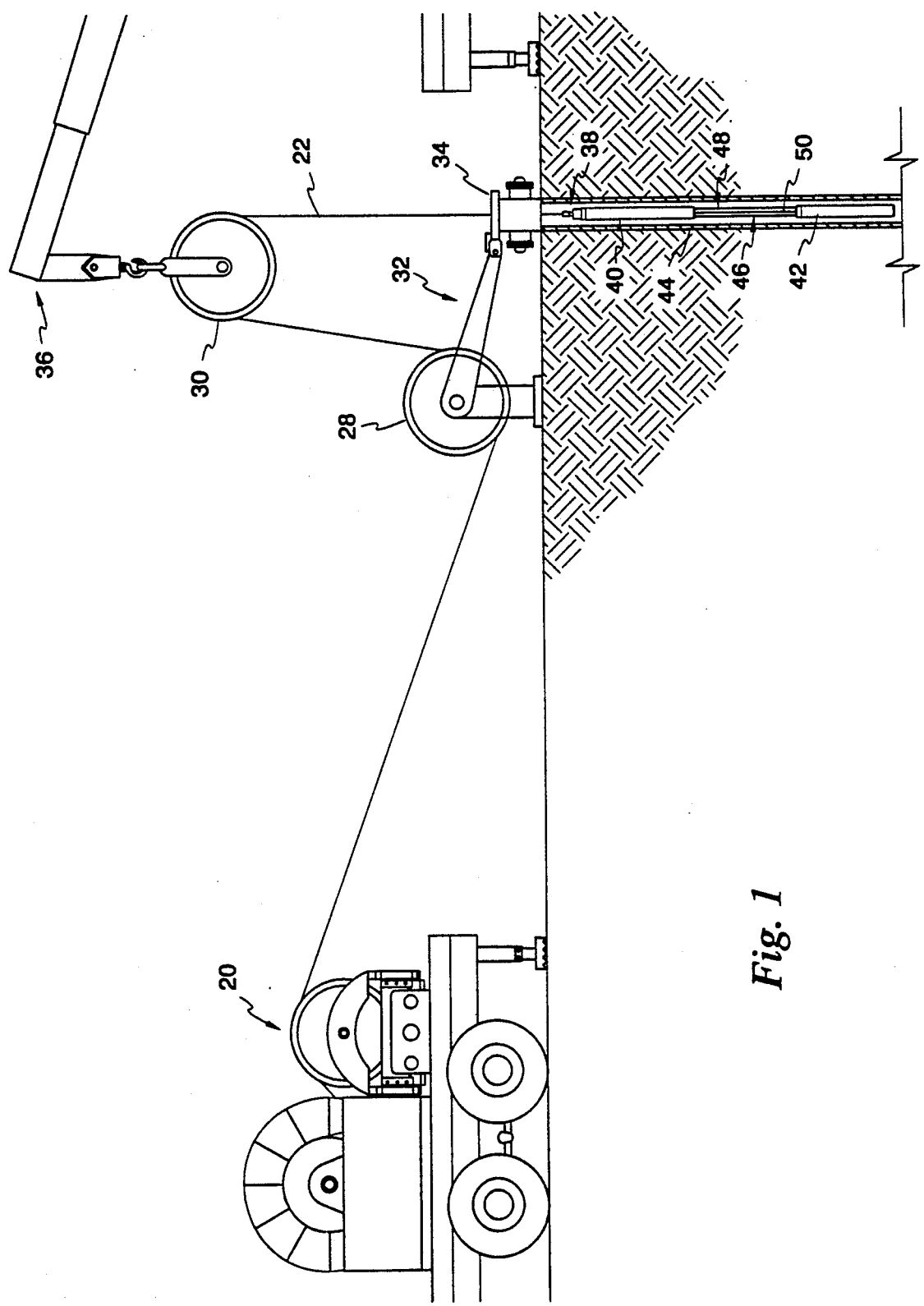
FIG. 1 is an illustration of a large surface draw works connected to the downhole hydraulic rotary seismic source and the downhole hydraulic power supply.

FIG. 1 is a schematic illustration of a surface draw works 20 connected to a hydraulic power package 40 and a downhole rotary seismic source 42. The large surface draw works 20 would be used to operate the downhole hydraulic rotary seismic source 42. A large reel of armored cable 22 containing both electrical power conductors and signal conducting wires is mounted on the draw works 20. A large power supply (not shown) connects to the power conductors through slip rings and provides power to the downhole source 42. Signals are also transmitted through slip rings between the downhole equipment and recorders, controllers, etc., located on the surface (also not shown). The cable 22 passes under a large diameter nylon sheave 28 attached by a pivoting support apparatus 32 to the well head 34. The cable 22 then threads over an upper identical sheave 30, supported from a crane 36 or mast, and attaches to the top end 38 of a downhole hydraulic power package 40, which converts electrical power to hydraulic power close to the seismic source 42.

FIG. 1 also shows the downhole rotary source 42 attached to the lower end 44 of the power package 40. Attached to the top of the source 42 are two hydraulic hoses, 46 and 48, and an electrical signal cable 50.

Figure 2:
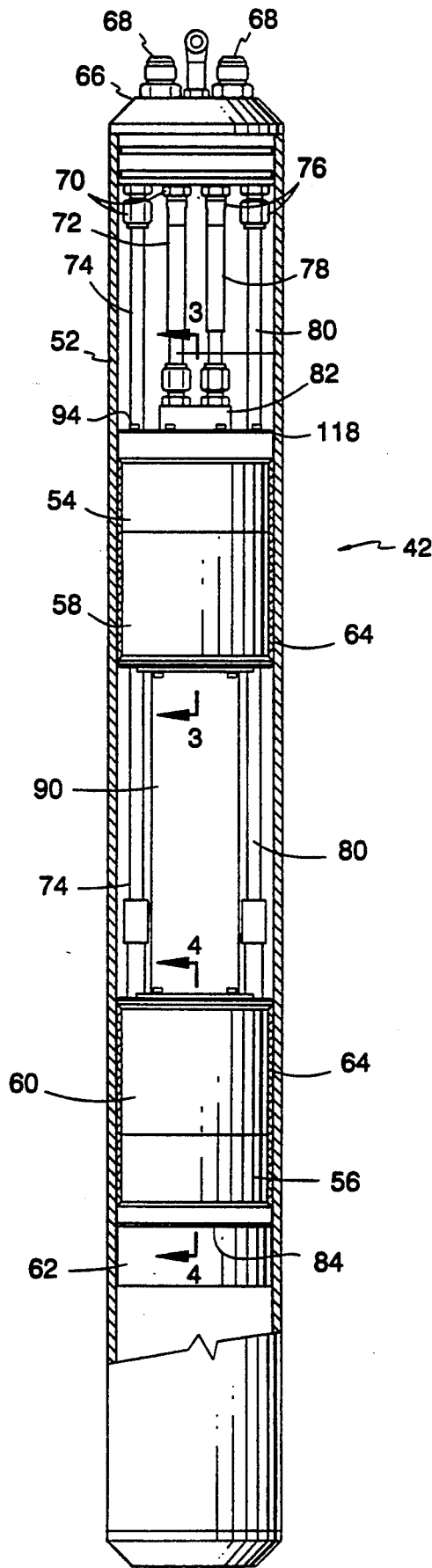
FIG. 2 is a partial vertical cutaway of the hydraulic rotary seismic source.
Figure 4:
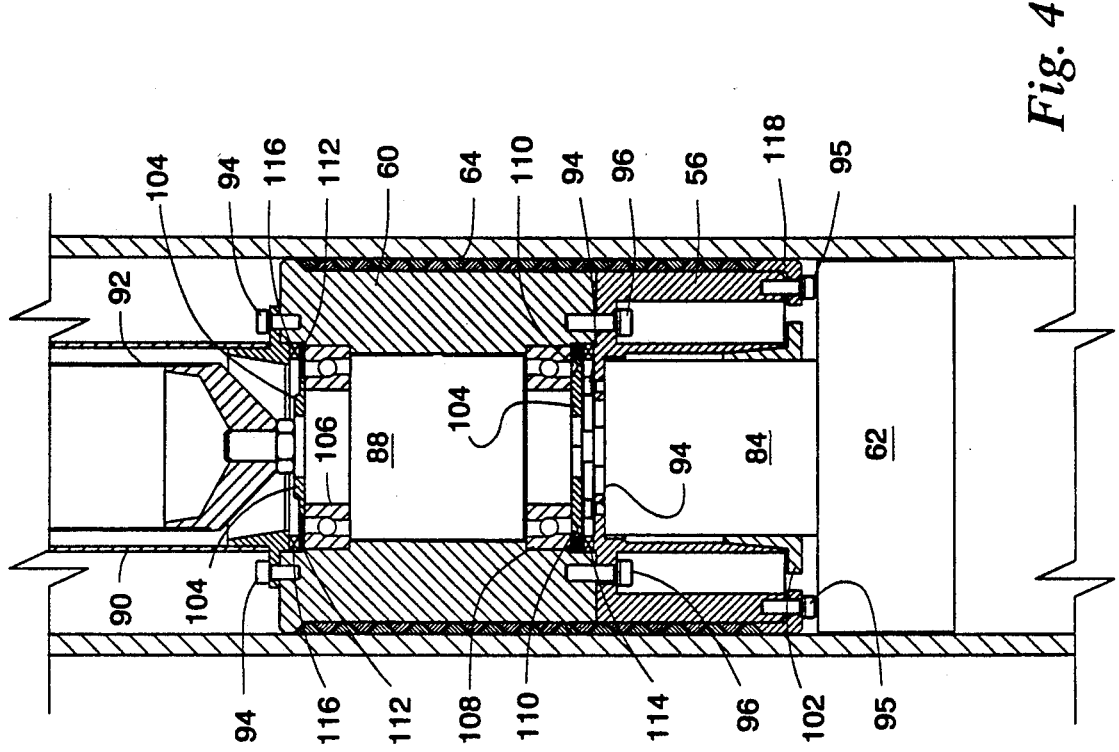
FIG. 4 is a cross sectional view along lines 4—4 of FIG. 2 of the hydraulic rotary seismic source.
Figure 3:
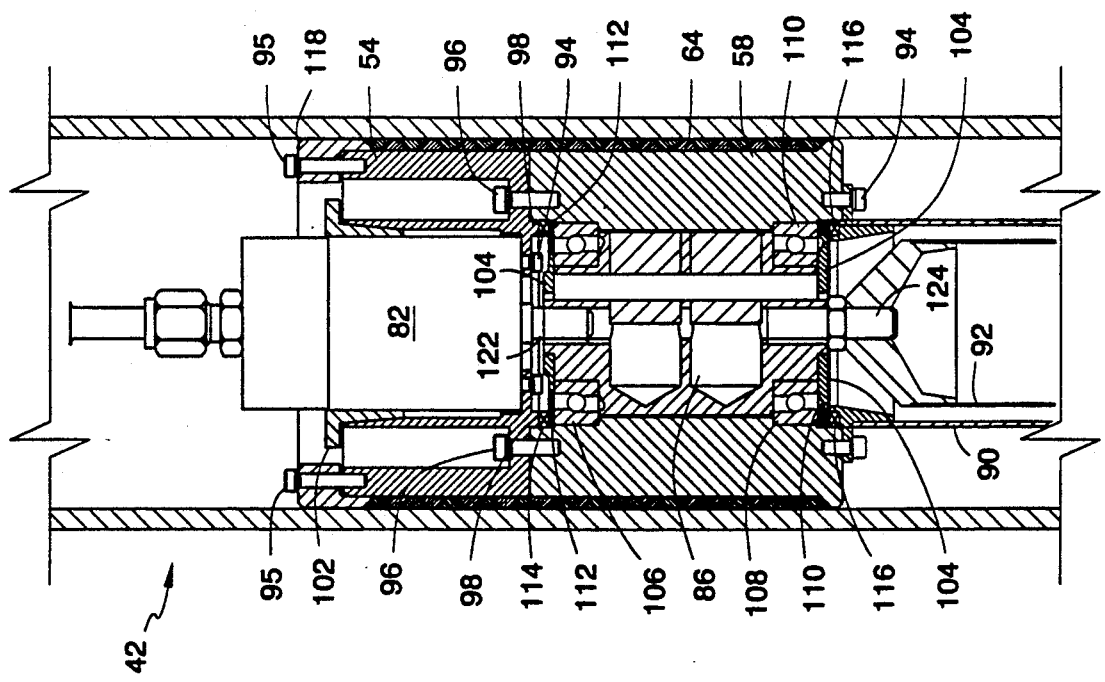
FIG. 3 is a cross sectional view along lines 3—3 of FIG. 2 of the hydraulic rotary seismic source.

FIGS. 2, 3 and 4 show the internal parts of the downhole hydraulic rotary source 42. FIG. 2 shows a portion of the cylindrical housing 52 cutaway to reveal the internal tubes, motor mounts 54, 56, rotor housings 58, 60, and a hydraulic manifold 62 for the bottom motor 84. Split wedge rings 64 are located between the rotor housings 58, 60 and the cylindrical outer housing 52. The top end cap 66 is also a manifold with two hydraulic ports 68 on top and four ports 70, 76 on the bottom. The pressure port 70 divides internally and provides fluid to the pressure line 72 to the top motor 82 and to the pressure line 74 to the bottom motor 84. The return port 76 is also divided and combines return flow from the tubes 78, 80 attached to the return ports of the two motors 82 and 84. In actual operation, the roles of these ports alternate since the direction of motor rotation is reversible.

In FIG. 2, the pressure 72, 74 and return 78 80 lines pass through longitudinal holes in the rotor housings 58, 60 and motor mounts 54, 56. Threaded fittings are formed into the top ends of tubes 72, 78 and bottom ends of tubes 74, 80. These fittings are equipped with o-rings for sealing and mate with the threaded portion of the manifolds 62 66. To prevent lateral vibration of the hydraulic lines 74, 80 passing through these holes, tapered nylon wedge tubes (not shown) are installed between the inside surfaces of the holes and the outside surfaces of the lines 74, 80.

Cross section 3—3 of FIG. 2, the upper section of downhole source 42, is shown in FIG. 3, and cross section 4—4 of FIG. 2, the lower section of downhole source 42 is shown n FIG. 4. These cross sections show the internal parts of the hydraulic rotary seismic source 42 or orbital vibrator. Illustrated in FIG. 3 is hydraulic motor 82 connected to the rotor assembly 86. FIG. 4 shows hydraulic motor 84 connected to rotor assembly 88. A structural tube assembly 90 connects the two rotor housings 58, 60 together while an inner hollow shaft 92 synchronizes the two rotors 86, 88 such that they rotate in unison with their respective eccentric masses always oriented in a common direction. A special manifold 62, illustrated in FIG. 4, is attached to the lower hydraulic motor 84. The manifold 62 provides connection ports for the delivery and return lines coming from the top of the vibrator 42.

As shown in both the upper and lower rotor systems, the outer diameters of the motor mounts 54, 56 and rotor housings 58, 60 join to form a continuous cylindrical surface upon which split wedge rings 64 are installed. The upper and lower motors 82, 84 are attached by machine screws 94 to their respective mounts 54, 56, and the mounts 54, 56 are then attached by additional machine screws 96 to their respective rotor housings 58, 60. As shown in FIG. 3, a lip 98 formed on the end of the motor mounts 54 engages a mating groove formed in the end of the rotor housings 58 and effectively aligns these two members. Tapered split motor wedge rings 102 are inserted in the space between the motors 82,84 cylindrical housing and the motor mounts 54, 56 and pressed into place with machine screws (not shown). The purpose of the wedges 102 is to prevent lateral vibration of motors 82, 84 with respect to their mounts 54, 56.

The bearing mounted rotor assemblies 86, 88, shown in FIGS. 3 and 4, are captured inside the rotor housings 58, 60. Bearing retainer rings 104, attached to the rotor assemblies 86, 88 by small machine screws not shown, press against the inner races of the upper bearings 106 and lower bearings 108 and lock these races in places on the rotors 86, 88. Lubricant return grooves 110 are formed in the bottom retainer rings 104. Thin seal rings 112 contact the outer races of the upper bearings 106 and remain stationary with the outer races as the inner races rotate. The seal rings 112 thus serve to help retain lubricant within the space between the races of the bearings 106.

Washer type wave springs 114 with specific spring ratings are placed between the seal rings 112 and the lip 98 of the motor mounts 54, 56. The purpose of the wave springs 114 is to allow a predetermined preload to be placed on the outer race of the upper bearings 106 so that the correct optimal axial load may be applied to the balls of the bearings 106. Identical wave springs 116 are installed at the bottom ends of the rotors 86, 88 and held in place by spacer rings and a lip formed on the end fitting of the synchronizing shaft assembly 92.

The faces of the split wedge rings 64 are shaped such that when the rings 64 are squeezed together axially, one type of ring expands while the second type contracts. The rings 64 are squeezed by the action of the compression cap 118 moving axially in the rotor assembly 86, 88. Machine screws 95 threaded into the motor mounts 54, 56 provide the squeezing force as the screws 95 are tightened. The large contact area provided by the split wedge rings 64 allows the rotating force being transferred from the rotors 86, 88 through the bearings 106, 108 to the external motor and rotor housing to be distributed over a significant length of the cylindrical housing 52. This improves stiffness, which is desirable, and assures that the shaking force is smoothly transferred to the housing 52. The compression cap 118 also serves as an accelerometer mount for the accelerometers installed 90 degrees away from each other (not shown).

As is illustrated in FIGS. 2, 3 and 4, the vibrator 42 is essentially a tube with masses lumped at the ends and at the rotor assemblies 86, 88. It is desirable in operation, to have the entire outer surface 52 of the tube move in unison. This is best assured if the centers of gravity of the two rotors 86, 88 are located at the two nodes of the fundamental bending mode of the tube system, which, for this design, are roughly one-fourth of the tube length from each end. Such strategic location will minimize any tendency to excite the source at its fundamental bending mode frequency, which should be well above the highest frequency produced in operation.

Figure 5A:
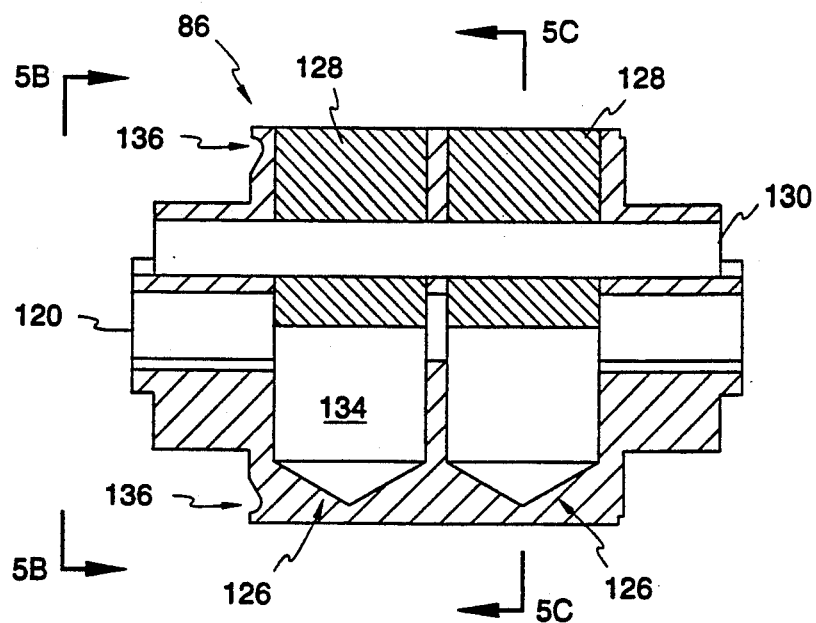
FIG. 5A is a cross sectional view of the eccentric weight rotor assembly of the rotary seismic source.
Figure 5B:
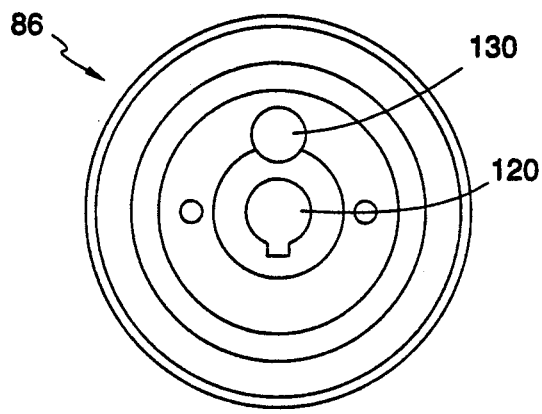
FIG. 5B is a cross section taken along lines 5B—5B of FIG. 5A.
Figure 5C:
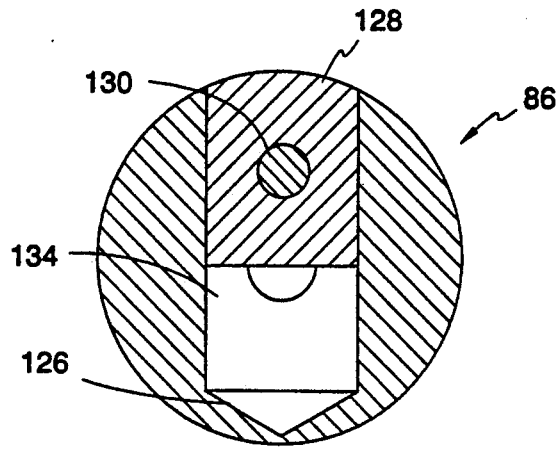
FIG. 5C is a cross section taken along lines 5C—5C of FIG. 5B.

FIGS. 5A, 5B and 5C are sectional views of one of the two identical rotors 86, 88 used in the source (illustrated in FIG. 3 as upper rotor 86). The objectives of this design are to provide a maximum of weight eccentricity for the weight of the rotor 86 and to minimize the wind drag which occurs as the rotor 86 spins during operation. The rotor 86 is formed from a solid high strength aluminum alloy cylinder or other similar material. A small diameter hole 120 is bored through the axis of the cylinder and then slotted to accept shaft 122 (shown in FIG. 3) from the drive motor 82 and a locking key on one end, and to accept shaft 124 (shown in FIG. 3) and key of the rotor synchronizing member 92 on the other end. Two parallel large diameter holes 126 are drilled radially almost, but not quite, through the rotor 86. Two brass plugs 128 are then fit into the large holes 126 and pinned in place by a stainless steel pin 130 passing lengthwise through the rotor 86.

After the plugs 128 are secured by pinning, the rotor 86 is machined to its final outside diameter with the outer ends of the plugs 128 forming part of the cylindrical surface as shown in FIG. 5C. The flat bottom ends of the two plugs 128 are aligned with the rotation axis of the rotor leaving two large cavities 134 within the rotor 86. These two cavities 134 reduce the rotors 86 overall weight while simultaneously increasing the weight eccentricity of the rotor 86. A smaller cylindrical surface is formed at each end of the rotor 86 to fit within a high speed spindle bearing.

An oil return groove 136 is formed in the end of the rotor as shown in FIG. 5B. In operation, the axis of the rotor 86 will be oriented vertically. As lubricant drains by gravity into the return groove 136, the rotation of the rotor 86 will cause the lubricant to move outward by centrifugal force. The upward curved portion of the groove 136 will direct the lubricant upward and back into the bearings. This feature helps prolong the life of the bearings, reduce heat from bearing friction, and eliminate the need for a separate bearing lubrication recirculation system. Of course, a separate lubrication system for the bearings may still be an option in the design.

The lateral displacement in air of an orbital vibrator driven by rotating eccentric weights is constant and is equal to wr/W, where w is the eccentric weight, r is the eccentricity, and W is the total weight of all parts of the vibrator. The greater the displacement of the vibrator, the greater the energy output. Therefore, to maximize output, the product wr should be as large as possible, and the total weight W should be as small as possible. This objective was used in the design of the rotor assemblies 86, 88, as previously mentioned. To further optimize energy output, the weight of the cylindrical housing 52 is minimized by using a single piece, thin-wall tube. Ideally, this housing would consist of an advanced composite material such as graphite epoxy. The tube must be thick enough to withstand wellbore pressures at depths to 10,000 feet or greater. Also, the ends must be thick enough to contain threads for attaching the end retaining screws. In order to use a single piece housing, the internal parts may be assembled as a cartridge and then inserted into one end of the cylindrical housing 52.

A valve (not shown) controls the direction and speed of the two hydraulic motors within the source and is located in the downhole hydraulic power supply 40 shown in FIG. 1. The motors 82, 84 are reversible and can be driven in either direction by the valve. A microprocessor-based ramp generator and control system, located either at the surface or downhole, may be used to provide the predetermined ramp-up and ramp-down input to the vibrator motors. The usual mode of operation for crosswell seismic work is to generate a ramp-up, ramp-down sweep first in one rotational direction and then to immediately generate a mirror image sweep in the opposite rotational direction. Of course, other vibrational modes, such as steady state operation, are possible. Output signals from the accelerometer are recorded during each sweep and can be used for correlation purposes.

The foregoing discloses an improved orbital seismic source capable of receiving several kilowatts of energy downhole to depths of several thousand feet wherein seismic shear waves and compression waves can be coupled through the borehole fluid into the borehole wall. The present invention features a rotor which is optimized for weight eccentricity to total rotor weight and with minimized rotational wind drag. The source provides distributed force contact between the internal components and the external housing and allows two hydraulic motors with single shafts to synchronously drive two separate rotor assemblies, which are located axially such that a tendency to excite a fundamental bending mode is minimized.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A downhole seismic source for the simultaneous generation of elliptically polarized shear wave seismic energy and compression wave seismic energy in a borehole comprising:

a substantially cylindrical housing having a central axis and two ends;

an orbital vibrating means disposed within said housing and energizable to impart an orbital motion for generating seismic shear wave energy and compression wave energy in said borehole, said orbital vibrating means including a mass located at each end of said cylindrical housing, at least two hydraulic drive motors providing rotational output, and at least two eccentric rotor assemblies receiving said rotational output, said rotor assemblies being aligned in parallel and radial alignment for synchronous eccentric rotation, said rotor assemblies further including a rotor housing, a bearing mounted, substantially cylindrical, rotor located within said rotor housing, said rotor having a central rotation axis slotted for receiving the input of rotation and having two parallel cavities perpendicular to said rotation axis which cavities are partially plugged, up to and in alignment with, the rotation axis, a synchronizing shaft interconnecting said rotors through said slotted rotation axis whereby said rotors rotate in unison, and a built-in lubricant recirculating system intended to lubricate the bearings of said rotor;

a hydraulic power means for energizing said orbital vibrator means including a conversion means for converting said electrical power to hydraulic power, and a connection means to said orbital vibrating means through hydraulic hoses and electrical signal cables; and a cable support means supporting said hydraulic power means and said orbital vibrating means at selected positions along said borehole, said cable support means including an electrical power conductor and signal conductors for controlling said hydraulic power means and said orbital vibrator means.

* * * * *